United States Patent
Wenger et al.

(10) Patent No.: US 9,814,181 B2
(45) Date of Patent: Nov. 14, 2017

(54) DRIVE MECHANISM FOR AUGERS OF AN AGRICULTURAL HARVESTER HEADER

(71) Applicant: CNH Industrial America LLC, New Holland, PA (US)

(72) Inventors: Bradley Wenger, Lancaster, PA (US); Andrew V. Lauwers, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 67 days.

(21) Appl. No.: 14/707,824

(22) Filed: May 8, 2015

(65) Prior Publication Data

US 2016/0324071 A1    Nov. 10, 2016

(51) Int. Cl.
| A01D 34/00 | (2006.01) |
| A01D 61/00 | (2006.01) |
| A01D 47/00 | (2006.01) |
| A01D 41/14 | (2006.01) |

(52) U.S. Cl.
CPC ........ *A01D 61/004* (2013.01); *A01D 41/142* (2013.01); *A01D 47/00* (2013.01)

(58) Field of Classification Search
CPC ...... A01D 41/142; A01D 41/14; A01D 34/30; A01D 41/16; A01D 57/20; A01D 89/005
USPC ........................................................ 56/14.5
See application file for complete search history.

(56) References Cited

U.S. PATENT DOCUMENTS

| 2,420,543 A | * | 5/1947 | Johnson ................. A01D 45/02 460/114 |
| 2,671,553 A | | 3/1954 | Herndon |
| 2,711,244 A | | 6/1955 | Hyman |
| 3,412,535 A | * | 11/1968 | Drummond ............ A01D 61/00 56/14.4 |
| 3,535,859 A | * | 10/1970 | Adams .................... A01D 41/14 56/10.4 |
| 3,609,948 A | | 10/1971 | Jones et al. |
| 3,808,783 A | * | 5/1974 | Sutherland ............. A01D 45/22 171/61 |
| 3,982,383 A | * | 9/1976 | Mott ...................... A01D 34/30 56/11.6 |
| 4,026,092 A | * | 5/1977 | Wehde ................. A01D 45/021 171/36 |
| 4,038,809 A | * | 8/1977 | Arnould ................ A01D 57/20 56/124 |

(Continued)

FOREIGN PATENT DOCUMENTS

CA            1215845 A        12/1986

OTHER PUBLICATIONS

EP 16168770, Extended European Search Report, dated Jul. 26, 2016, 8 pages.

*Primary Examiner* — Arpad Fabian-Kovacs
(74) *Attorney, Agent, or Firm* — Peter K. Zacharias; Patrick M. Sheldrake

(57) ABSTRACT

A header of an agricultural harvester for the transport of a flow of crop from a header to a combine feeder house. The header includes a frame having a floor, a conveyor assembly, and a drive mechanism. The conveyor assembly is mounted above the floor to urge a flow of crop material during harvesting operations, and the drive mechanism operatively connects to the conveyor assembly to drive movement of the conveyor assembly. The drive mechanism includes a drive motor mounted to the frame beneath the floor about a medial section of the header.

13 Claims, 8 Drawing Sheets

(56) References Cited

U.S. PATENT DOCUMENTS

| | | | | |
|---|---|---|---|---|
| 4,115,983 | A * | 9/1978 | Barnes | A01D 43/082 56/111 |
| 4,216,641 | A * | 8/1980 | Koch | A01D 43/105 56/14.4 |
| 4,227,366 | A | 10/1980 | Pucher | |
| 4,300,333 | A * | 11/1981 | Anderson | A01D 61/008 198/666 |
| 4,467,590 | A * | 8/1984 | Musser | A01D 69/00 56/11.2 |
| 4,550,554 | A * | 11/1985 | Lundahl | A01D 34/412 56/121.42 |
| 4,663,919 | A * | 5/1987 | Stroh | A01D 69/00 56/11.2 |
| 5,005,342 | A * | 4/1991 | Lundahl | A01D 34/53 56/10.2 R |
| 5,056,303 | A | 10/1991 | Lawrence | |
| 5,195,309 | A | 3/1993 | Mossman | |
| 5,305,586 | A * | 4/1994 | Lundahl | A01D 34/53 56/14.4 |
| 5,330,114 | A | 7/1994 | Trenkamp et al. | |
| 5,791,128 | A * | 8/1998 | Rogalsky | A01D 41/142 56/10.9 |
| 6,119,443 | A | 9/2000 | Rauch | |
| 6,564,535 | B1 | 5/2003 | Nafziger et al. | |
| 6,625,969 | B2 | 9/2003 | Glazik | |
| 6,666,007 | B2 | 12/2003 | Schroeder | |
| 7,043,891 | B2 | 5/2006 | Rickert et al. | |
| 7,073,316 | B2 | 7/2006 | Resing et al. | |
| 7,395,649 | B2 | 7/2008 | Wubbels et al. | |
| 7,520,113 | B2 * | 4/2009 | Johnson | A01D 41/142 460/20 |
| 7,555,882 | B2 * | 7/2009 | Clauss | A01D 41/142 56/10.2 G |
| 7,587,885 | B2 | 9/2009 | Tippery et al. | |
| 7,802,417 | B2 * | 9/2010 | Sauerwein | A01D 41/14 56/181 |
| 7,921,627 | B2 * | 4/2011 | Sauerwein | A01D 41/14 56/181 |
| 8,266,881 | B2 * | 9/2012 | McIlwain | A01D 89/005 56/208 |
| 8,667,770 | B2 | 3/2014 | Fuechtling | |
| 9,258,944 | B2 | 2/2016 | Allochis | |
| 2007/0261379 | A1 * | 11/2007 | Johnson | A01D 41/142 56/11.2 |
| 2008/0161077 | A1 * | 7/2008 | Honey | A01D 75/187 460/106 |
| 2008/0295474 | A1 * | 12/2008 | Tippery | A01D 57/20 56/14.5 |
| 2009/0145096 | A1 * | 6/2009 | Priepke | A01D 41/142 56/257 |
| 2012/0317953 | A1 * | 12/2012 | Allochis | A01D 57/20 56/153 |

* cited by examiner

DRIVE MECHANISM FOR AUGERS OF AN AGRICULTURAL HARVESTER HEADER

BACKGROUND

The subject application relates generally to an apparatus for a header of an agricultural harvester, such as, but not limited to, a combine, windrower or the like. In particular, the subject application relates to a header feeding system of an agricultural harvester.

Combines and harvesters having headers with augers are known in the art. For example, cross augers convey cut crop from the outer ends of the header towards the center of the header for feeding into a feeder house. In a typical configuration, there are two lateral cross augers whose longitudinal dimension is perpendicular to the direction of travel of the combine. These lateral cross augers convey a flow of cut crop material towards the center of the header by rotating their top surface from the outside in.

In such a typical configuration, the flow of cut crop material to the feeder house from the header makes a sharp ninety degree turn as it is conveyed in a perpendicular direction toward the combine feeder house. The flow of cut crop to the feeder house can lead to disadvantageous misalignments and interruption of flow of cut crop in transit. These misalignments and interruptions thus reduce the speed at which the harvester can process crop.

BRIEF SUMMARY

In accordance with a first aspect, the subject application provides a header of an agricultural harvester including a frame having a floor, a conveyor assembly, and a feeder assembly. The conveyor assembly is mounted to the frame and includes a conveyor and a conveyor drive mechanism for driving the conveyor. The feeder assembly is mounted to the frame and has a rotary device and a rotary drive mechanism operatively connected to the rotary device to drive rotation of the rotary device.

In accordance with a second aspect, the subject application provides a header for an agricultural harvester including a frame having a floor, a conveyor assembly, and a feeder assembly. The conveyor assembly is mounted to the frame and has a rotatable auger configured to rotate at a first rotational speed. The feeder assembly is also mounted to the frame and has a rotary device rotatably connected to the conveyor assembly and is configured to rotate at a second rotational speed independent of the rotatable auger.

In accordance with a third aspect, the subject application provides a header for an agricultural harvester including a frame having a floor, a conveyor assembly, and a drive mechanism. The conveyor assembly is mounted above the floor to urge a flow of crop material during harvesting operations. The drive mechanism is operatively connected to the conveyor assembly to drive movement of the conveyor assembly. The drive mechanism includes a drive motor mounted to the frame beneath the floor about a medial section of the header.

In accordance with a further aspect, the subject application provides a feeder assembly for a header of an agricultural harvester which serves as an active element for feeding crops into a harvester feeder opening. This aspect allows for a design without the need for hangers and supports which, in existing header designs, are mounted to the top beam of the harvester. Such hangers and supports can cause interference with the operation of the harvester that occurs due to crop accumulation around and near the hangers and supports. Such crop accumulation can reduce operator visibility. Additionally the feeder assembly is driven by a drive mechanism which is positioned centrally on the header. The position of the drive mechanism allows an operator to perform in-cab adjustment of finger timing of the feeder assembly.

In accordance with a further aspect of the subject application, in addition to two conveyance augers (as there are in existing header models), there is a hydraulic drive paddle feeding system which acts as an active element to increase capacity of the header. The hydraulic drive paddle feeding system acts to move a flow of crop into the harvester feeder opening. This aspect eliminates the need for auger supports mounted from the top beam of the header and utilizes the floor of the center of the header to support the augers, paddle feeding system, and any adjustment mechanisms for the flighting of the augers or the heights of the paddles.

In accordance with yet another aspect, a drive mechanism which drives a paddle feeding system is mounted underneath the floor of the header. The drive mechanism is connected to the paddle feeding system by an endless belt that is contained within and shielded by the supports for the augers, paddle feeding system, and adjustment mechanisms in the center of the header. A bolt is placed underneath the floor on either side of the supports to adjust the height of the paddles or the flighting of the augers with a wrench. Turning the bolt can raise or lower the height of the paddles or alter the flighting of the augers from the floor. In addition, contained within and mounted below the floor is a hydraulic cylinder that can be used to adjust the finger timing of the paddles on the paddle feeder system.

The aspects described in the subject application provides various advantages over existing headers. These advantages include removing areas where crop can catch and build up on the header. These advantages also include easier adjustment of header components and adjustment of certain components from within the cab of the harvester. The aspects described herein provide for a paddle feeding system with a drive positioned underneath the floor of the header. The position of the drive underneath the floor allows for easy adjustment (e.g., by a bolt) of header components such as adjusting the height of the augers and/or paddles from underneath the floor. These aspects differ from existing headers that do not use active elements for feeding crop into the feeder other than through standard auger designs.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
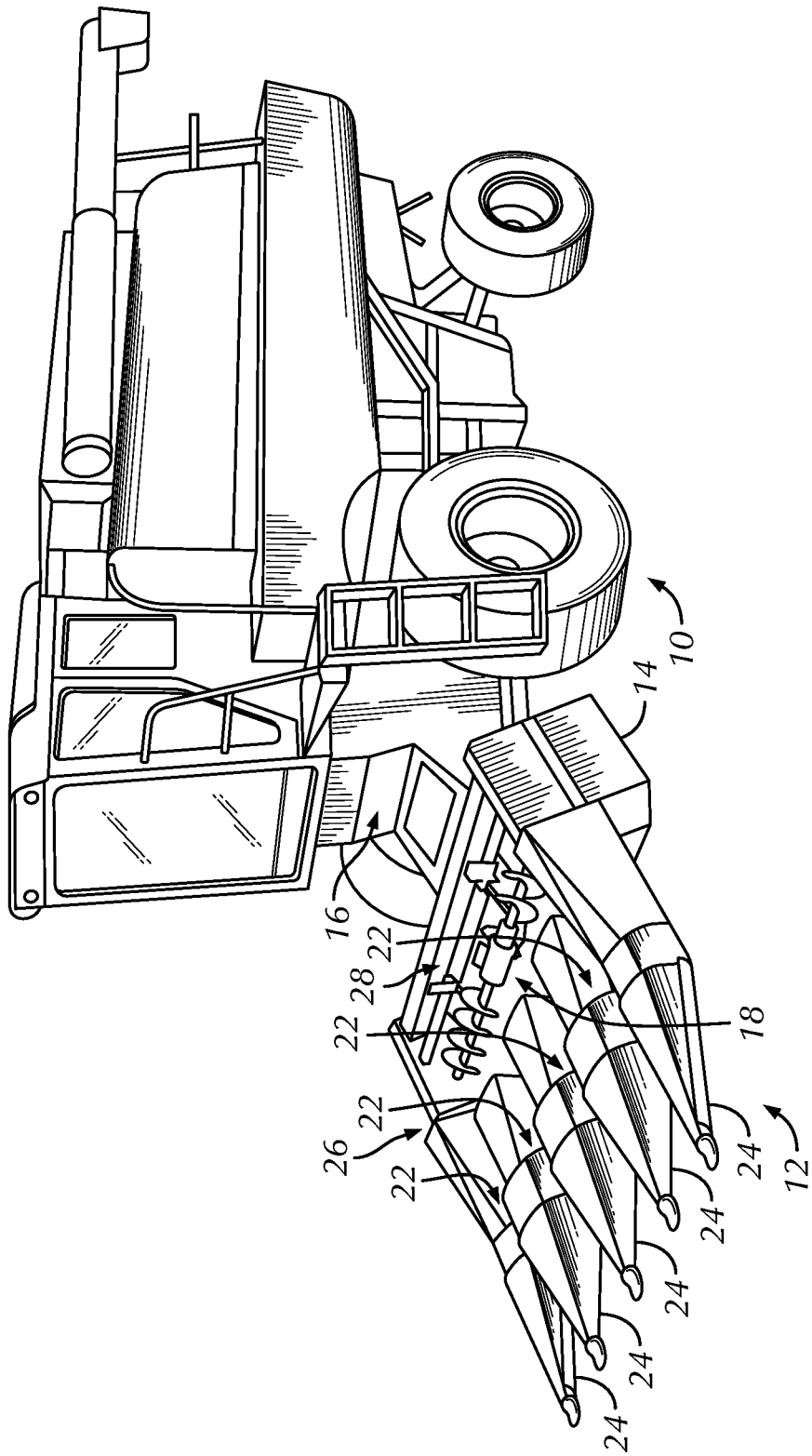
FIG. 1 is a perspective view of an agricultural harvester including a header applicable to the subject application.

Referring now to the drawings wherein aspects of the subject application are shown, FIG. 1 illustrates header 12 according to an aspect of the subject application as applied to an agricultural harvester or combine 10. For exemplary purposes and not by way of limitation, FIG. 1 is illustrated as a corn header but the subject application can be applied to any other header such as draper headers, axial-flow headers, grain platforms, flex platforms, row crop headers, or the like. The header 12 provides an improvement to current conventional header assemblies of agricultural harvesters by incorporating a feeder assembly 28 that allows for more efficient feeding of a flow of crop to a feeder house 16 of the combine 10. The header provides a further advantage by including a centrally located drive mechanism that can provide independent rotary drive to the feeder assembly and/or the conveyor assembly. Feeder houses and harvesting operations are known in the art and a further detailed description of their structure, function, and operation is not necessary for a complete understanding of the various aspects of the subject application. However, typical headers applicable to the subject application are disclosed e.g., in U.S. Pat. Nos. 7,395,649 and 6,119,443, the entire disclosures of which are incorporated by reference herein for all purposes.

The header 12 includes frame 14 for mounting to a forward end of the agricultural harvester 10, a conveyor assembly 20 mounted to and extending widthwise across the frame 14 for conveying crop material centrally with respect to the frame and toward a combine feeding location or feeder house 16 through channel 18. While the aspects described in the subject disclosure can be implemented with various types of headers, for exemplary purposes the header illustrated in FIG. 1 is a corn header that includes a plurality of row units 22 extending forwardly from the frame 14. The exemplary header shown in FIG. 1 further includes a plurality of dividers 24 extending forward from the frame 14. Such dividers 24 are known in the art and a further detailed description of their structure, function, and operation is not necessary for a complete understanding of the subject application. However, typical dividers applicable to the subject application are disclosed e.g., in U.S. Pat. Nos. 5,195,309, 6,625,969, and 7,073,316, the entire disclosures of which are incorporated by reference herein for all purposes.

The frame 14 has a floor 36 (FIG. 3), a back wall, a first side wall, a second side wall, and an open side. The back wall includes an opening through which a flow of crop can be directed towards the feeder house. The first and second side walls define the lateral edges of the frame. In certain aspects of the subject application one or both of the first and second side walls include a mount point suitable for mounting a conveyor drive mechanism. In a typical configuration the frame is mounted on the front of the combine to align the opening of the back wall of the frame with a conduit on the combine through which a flow of crop can be directed so that the flow of crop reaches the feeder house 16 of the combine. In an exemplary header, as illustrated in FIG. 1, row units are mounted about the open side.

In operation the combine collects and processes crop as it moves through a field of crop. As the combine moves forward the header makes contact with crop so that the crop enters the header about the open side of the frame. In an example of typical functioning of a corn header, such as the header shown in FIG. 1, as the combine travels forward corn stalks are bent and processed by the row units. The row units separate the corn stalks from the ears of corn. The separated ears of corn then arrive onto the floor of the frame where they make up the flow of crop/crop material in the header.

Figure 2:
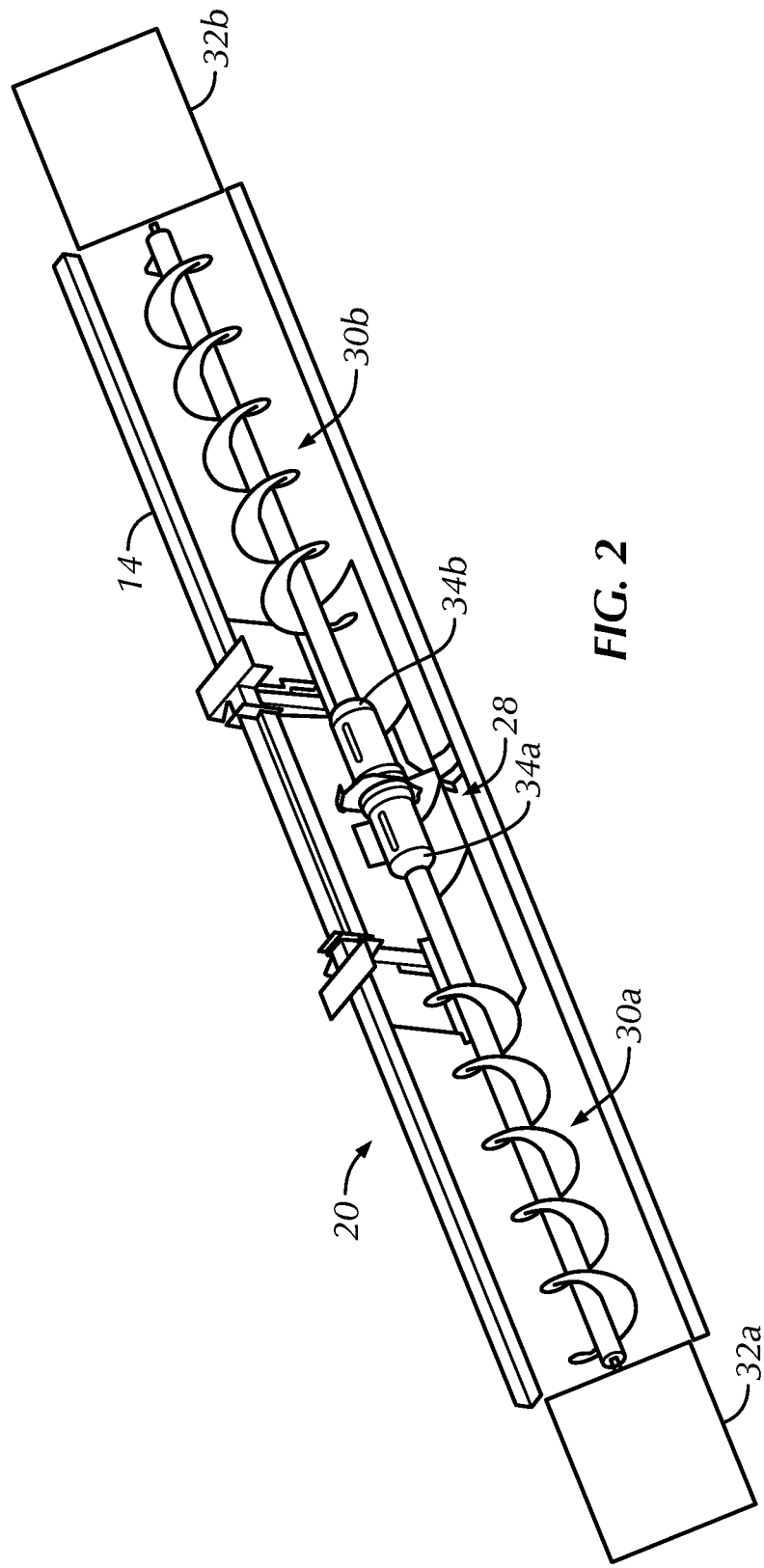
FIG. 2 is a perspective view of a conveyor assembly and a feeder assembly of a header of an agricultural harvester in accordance with the subject application.

FIG. 2 shows a perspective view of conveyor assembly 20 and feeder assembly 28. The feeder assembly 28 is positioned about a center of the frame towards the back wall. The conveyor assembly has two conveyors 30a, 30b each of which is attached to respective lateral ends of the feeder assembly. Taken as a whole the conveyor assembly and the feeder assembly runs widthwise across the header substantially perpendicular to a direction of travel of the combine. The connection between the feeder assembly and the conveyor assembly is made by rotary connections which are covered by connection covers 34a, 34b.

The conveyor assembly 20 illustrated in FIGS. 1 and 2 includes rotatable augers as the conveyors, however, it should be understood that other suitable conveyors may be used e.g., conveyor belts and the like. The conveyors 30a, 30b are shown extending from the feeder assembly to each of the outer lateral edges of the frame 14. Conveyor drive mechanisms 32a, 32b are mounted to one or both of the first side wall or the second side wall of the frame 14. The conveyor drive mechanisms are operatively connected to the conveyors to drive rotation of the conveyors. Such conveyor drive mechanisms are known in the art and a detailed description of such drive mechanisms is not necessary for a complete understanding of the subject disclosure. However, comparable conveyor drive mechanisms applicable to the subject disclosure are described in U.S. Pat. Nos. 6,564,535 and 7,043,891, the entire disclosures of which are hereby incorporated by reference in their entirety for all purposes. The end of each conveyor distal from the respective conveyor drive mechanism (i.e., medial to the frame) is connected to the feeder assembly by rotary connections. The rotary connections on each end of the feeder assembly are covered by connection covers 34a, 34b, respectively.

Figure 3:
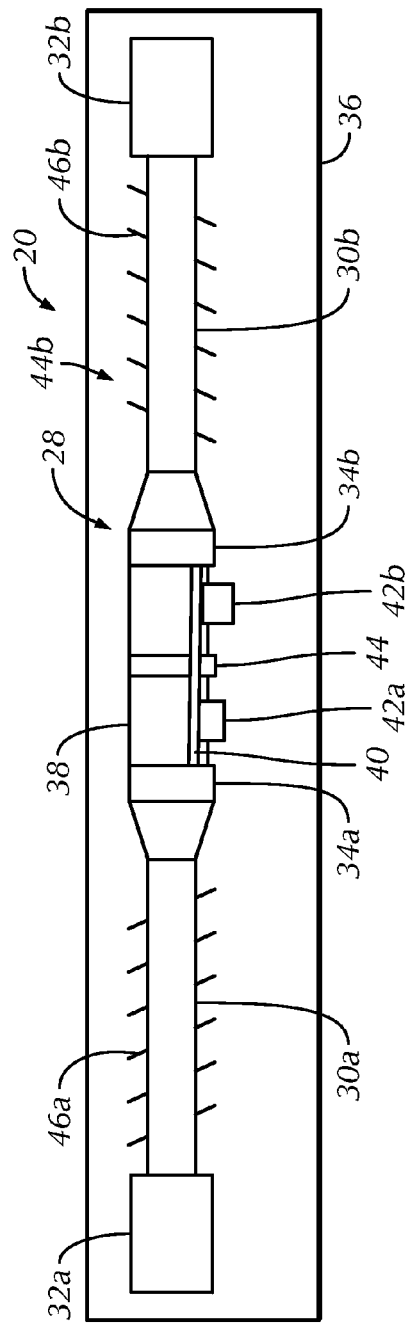
FIG. 3 is a top schematic view of the conveyor assembly and feeder assembly of FIG. 2.
Figure 4:
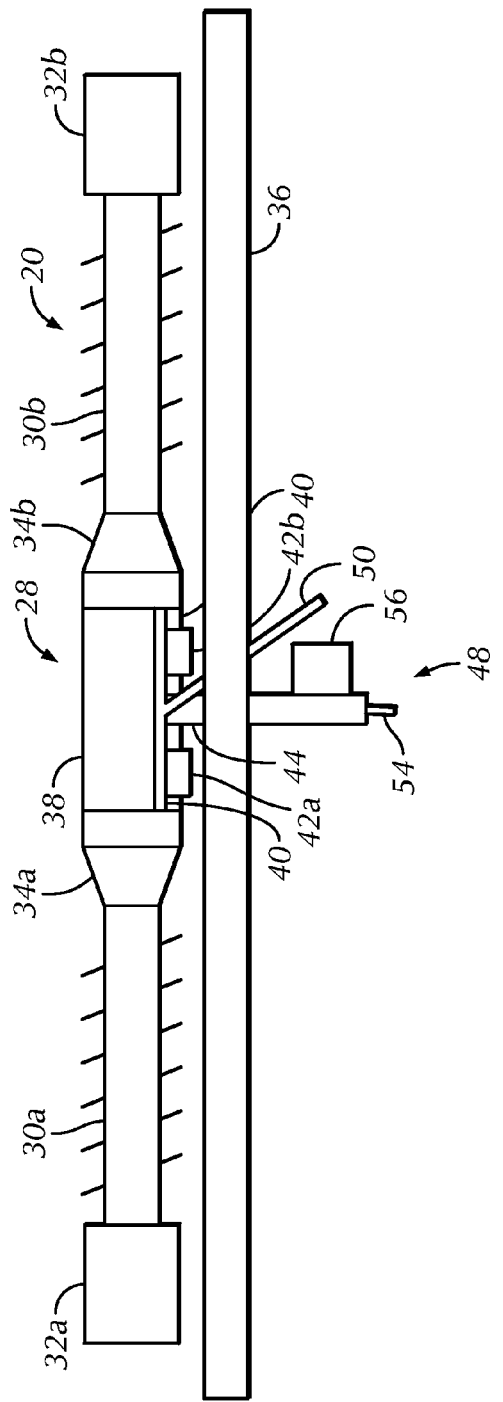
FIG. 4 is a front schematic view of the conveyor assembly and feeder assembly of FIG. 2.
Figure 5:
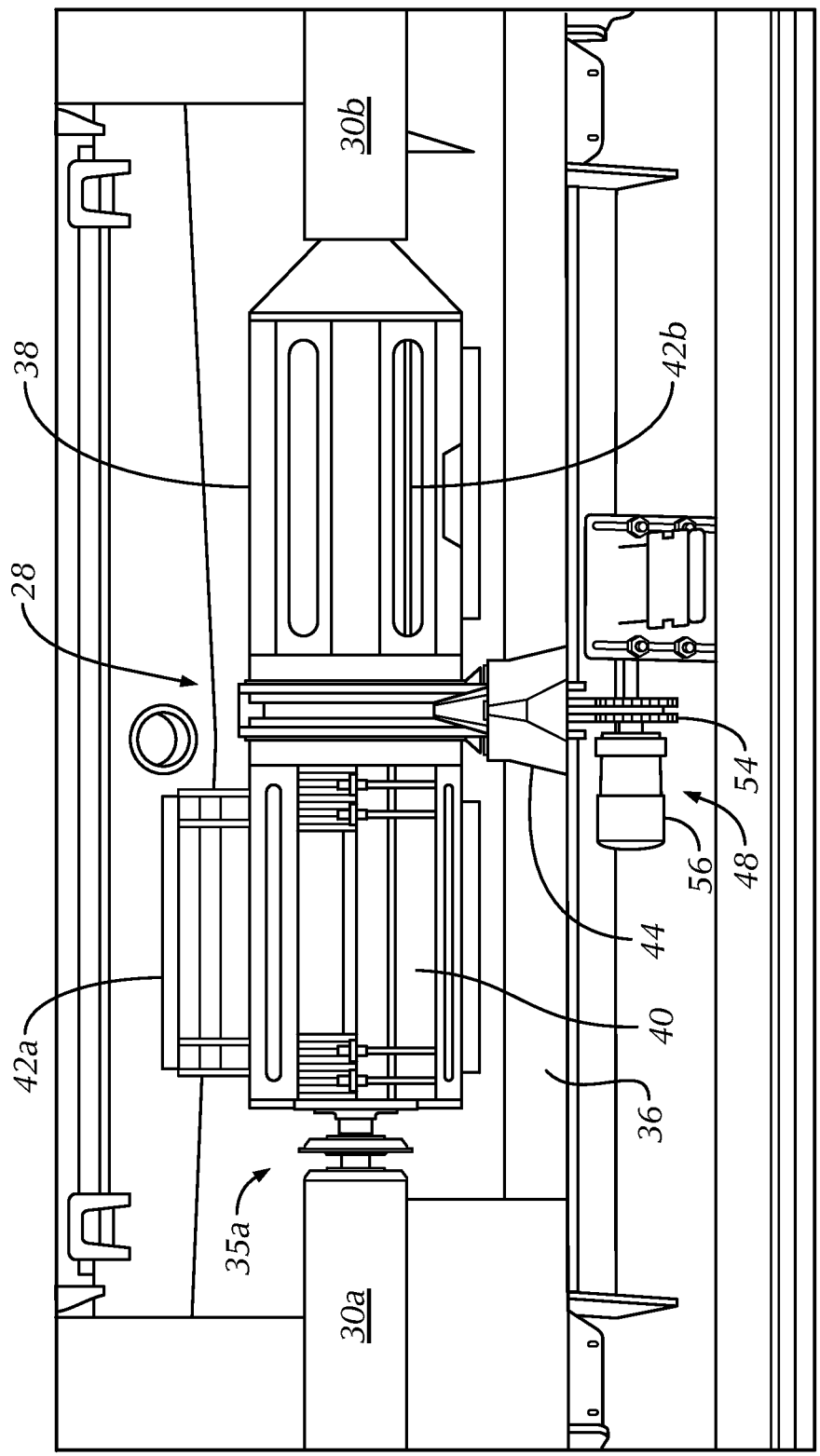
FIG. 5 is an enlarged partial frontal perspective view of the feeder assembly of FIG. 2.

Referring to FIGS. 3-5, the conveyor assembly 20 is positioned above the floor 36 and near the back wall of the frame. Each of the two conveyors 30a, 30b are collinear with respect to each other and each of the conveyors is mounted on a respective first side or second side wall of the frame. On the exterior of each of the first and second side walls is mounted a respective conveyor drive mechanisms 32a, 32b. The conveyor drive mechanism or mechanisms provide rotational drive which is imparted to each of the conveyors. Rotation of the conveyors acts to drive a flow of crop material toward the medial portion of the frame i.e., towards the center of the header. The conveyors each rotate to direct crop from the sides of the frame towards the feeder assembly 28.

In certain aspects the conveyors 30a, 30b may be rotatable augers as illustrated in FIGS. 3 and 4, but alternatively the conveyors can be belts or any other conveyor known in the art and suitable for the stated intended purpose. In an aspect where the conveyors are rotatable augers, the rotatable augers have flightings 46a, 46b. The rotation of the conveyors causes the flightings 46a, 46b to direct a flow of crop from the edges of the header to the medial portion of the header near the feeder assembly. In certain aspects the characteristics of the flightings (for example, the angle of the flightings) may be adjusted by an adjustment mechanism that is accessible from beneath the floor of the frame or from the cab of the agricultural harvester.

FIGS. 3 and 4 show respective top and front schematic views of conveyor assembly 20 and feeder assembly 28. FIG. 5 shows an enlarged detailed view of the feeder assembly 28. Note that on a side of the feeder assembly shown in FIG. 5 the connection cover 34a is not shown so that a rotary connection 35a is visible.

Figure 8:
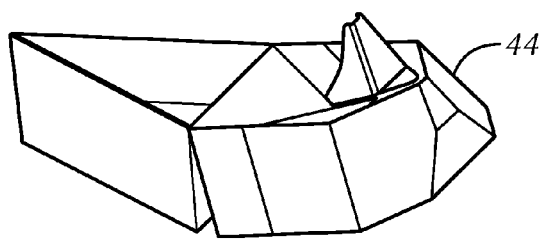
FIG. 8 is a perspective view of a mount of the feeder assembly of FIG. 5.

As shown in those figures, the feeder assembly is supported above the floor 36 of the header. Attached to the top side of the floor is a mount 44 that provides support to the conveyor assembly and the feeder assembly. In an aspect, the mount is shaped to minimize resistance to the flow of crop material for example, by narrowing the profile of the mount that is closest to the open side of the frame i.e., exposed to the flow of crop material, as shown in FIGS. 5 and 8.

The feeder assembly 28 is connected to the frame by the mount 44 and configured as shown in FIG. 5. The feeder assembly has a rotary device 38 and a rotary drive mechanism 48. The rotary device includes two substantially cylindrically-shaped bodies or canisters each having a cylindrical surface and two endcaps. Each of the canisters has a flat endcap on each side of the canister. For each of the two canisters there is a first (inner) endcap that is more central with respect to the frame and a second (outer) endcap that is positioned nearer to each of the respective side walls of the frame. Each canister is formed with one or more slots about the cylindrical surface of the canister. As shown in FIGS. 3 and 4 the canisters are aligned with each other in an end-to-end configuration and are positioned collinear with a longitudinal axis of the conveyors. On the inner endcap of each canister is an operative connection to a rotary drive mechanism 48. The rotary drive mechanism is suitable to drive rotation of the rotary device. In addition to providing rotational drive to the rotary device, the rotary drive mechanism provides support to each canister of the feeder assembly. The rotary drive mechanism is itself in part supported by the mount 44.

As shown in FIGS. 3 and 4, connection covers 34a, 34b are positioned on the respective outer endcaps of the rotary devices. The connection covers are frustroconical shields positioned to protect the rotary connections on each side of the rotary device from dust particles that can interfere with the operation of the rotary connections. For illustration purposes, in FIG. 5, one of the two connection covers is not shown so that rotary connection 35a can be seen. On each side of the feeder assembly there is a rotary connection that provides an operable connection between the feeder assembly and the conveyor assembly. That is, within each of the two rotary connections are bearing assemblies that allow the conveyors of the conveyor assembly and the rotary device of the feeder assembly to rotate independently of each other. In sum, the rotary connections allow the conveyors to be connected to the feeder assembly while allowing each of the conveyors and rotary devices to rotate independently of each other. For example, in certain aspects of the subject disclosure, a conveyor is driven by the conveyor drive mechanism at a first rotational speed and a rotary device is independently driven by a rotary drive mechanism at a second rotational speed that is independent of the first rotational speed.

Figure 6:
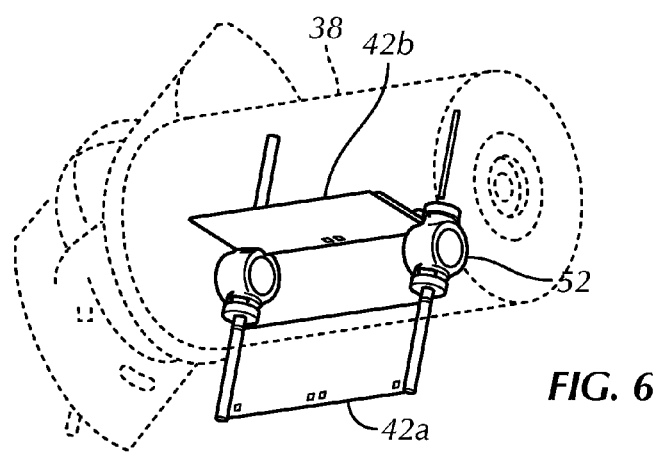
FIG. 6 is an enlarged perspective view of extension members and axis mount of a left portion of the feeder assembly of FIG. 2 with certain portions drawn in phantom.
Figure 7:
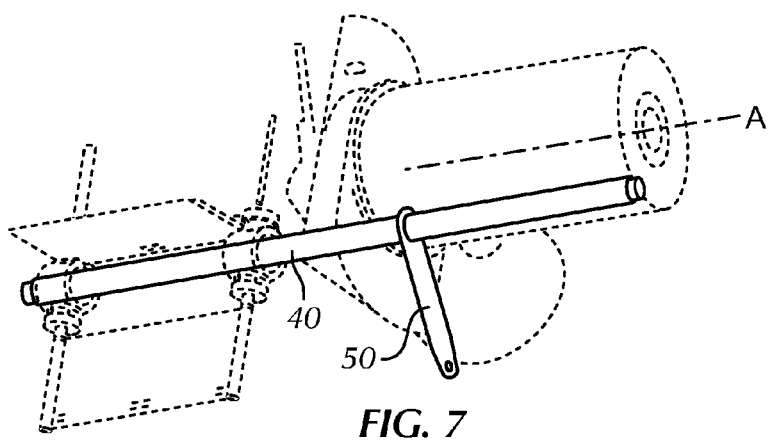
FIG. 7 is an enlarged perspective view of the axis and adjustment mechanism of the feeder assembly of FIG. 2 with certain portions drawn in phantom.

Referring to FIGS. 6 and 7, within the interior of each canister is axis 40 which spans the length of the feeder assembly 28 and is positioned offset from and substantially parallel to a central rotational axis A of the feeder assembly. Each end of axis 40 is connected to a respective outer endcap of each rotary device (not shown). The axis 40 is configured to be fixably movable with respect to the cylindrical surface of the canister (or, from the central rotational axis of the canister). The distance from the axis 40 to the central rotational axis A of the canister is referred to as the offset. The length of the offset may be varied by an adjustment mechanism 50, as further described below.

Mounted to each axis 40 are respective extension members 42a, 42b. Each extension member is pivotably connected to its respective axis 40. The extension members thus pivotably connected are free to rotate or pivot around the axis. Each of the extension members extends from the axis through the slot on the cylindrical surface of its respective canister so that each extension member extends radially beyond the cylindrical surface of each canister. FIG. 6 shows a detailed view of extension members 42a, 42b and the axis mount 52 which fixes the extension member to the axis 40. As shown in FIGS. 5 and 6 a feeder assembly thus configured has an axis extending across the rotary device and offset from a central rotational axis of the rotary device, and an extension member extending from the axis for urging a flow of crop material rearwardly (toward the back wall) of the frame during harvesting operations of the header. It will be understood that the extension members may be formed as solid paddles, screens, forks, tines or other similar configurations depending on suitability for a particular crop type, rate of crop flow, or other factors.

Referring back to FIG. 5, the feeder assembly 28 includes the rotary drive mechanism 48 having a rotary drive motor 56 and an endless belt 54 operatively connected to the rotary drive mechanism. In certain aspects of the subject disclosure the rotary drive mechanism includes a rotary drive motor that is mounted beneath the floor. The rotary drive motor may be an electric motor, a liquid fueled motor, or similar mechanism for generating rotational power. The rotary drive motor is mounted to the frame and positioned beneath the floor 36 to provide an independent rotational drive for the feeder assembly.

The endless belt 54 transits through one or more holes in the floor of the frame. Above the floor, the endless belt is operatively connected between the rotary device and the rotary drive motor. Below the floor the endless belt is operatively connected to the rotary drive motor. The endless belt is driven by the rotary drive motor and translates rotational power to the rotary device. Various technologies may be used to implement the functionality achieved by the endless belt as described herein e.g., roller chains, Morse chains, or the like.

As shown in FIG. 5, the header has mount 44 supporting the feeder assembly on the frame and the rotary drive mechanism has rotary drive motor 56 that is mounted to the frame at a position underneath the floor. The rotary drive mechanism has the endless belt operatively connected between the rotary device and the rotary drive motor. The length of the endless belt between the feeder assembly and the floor is encapsulated by the mount.

The connection covers protect respective rotary connections at each end of the feeder assembly. The rotary connections allow the conveyor assembly to be connected to the feeder assembly while providing isolation of the rotation of the conveyors from the rotation of the feeder assembly. This can be accomplished e.g., by a bearing assembly connection shown in FIG. 5 between the axis of the conveyor and the feeder assembly. In accordance with certain aspects of the subject disclosure this configuration allows the conveyor assembly 20 to rotate at a rotational speed which is independent of the rotational speed of the feeder assembly 28. The independent rotational speed of the feeder assembly is provided by the rotary drive mechanism as opposed to the conveyor drive mechanism. In accordance with other aspects of the subject disclosure, the rotary drive mechanism 48 can be configured to impart rotational drive to the conveyors without reliance on a conveyor drive mechanism. Alternatively, the rotary drive mechanism may be configured to impart rotational drive to the conveyor assembly and the feeder assembly in combination with the conveyor drive mechanism (not shown in FIG. 5).

As shown in FIGS. 2-4 in certain aspects of the subject disclosure a conveyor has a first conveyor segment 30*a* and a second conveyor segment 30*b* where each of the first conveyor segment and the second conveyor segment has a respective conveyor drive mechanism 32*a*, 32*b*. In certain aspects each of the conveyor segments may be driven independently driven by the respective conveyor drive mechanisms. As shown in FIG. 2 in such an aspect there is a feeder assembly 28 mounted to the frame between the first and second conveyor segments.

During harvesting operations the agricultural harvester receives cut crop material onto the floor of the frame as the harvester operates and a flow of crop material flows towards the back wall of the header. The flow of crop material is further directed by the rotation of the conveyors centrally with respect to the frame and towards the feeder assembly. When the flow of crop material arrives at the feeder assembly the extension members engage the flow of crop material to urge it rearwardly of the frame and towards the feeder house of the harvester. In order to shield the endless belt from the flow of crop material past the feeder assembly the mount 44 is configured to encapsulate the endless belt between the floor and the feeder assembly. The mount supports the feeder assembly on the frame and the rotary drive mechanism has the rotary drive motor mounted to the frame at a position underneath the floor. The rotary drive mechanism also has the endless belt operatively connected between the rotary device and the rotary drive motor and the mount encapsulates the endless belt between the feeder assembly and the floor.

There are advantages provided by designs in accordance with aspects of the subject disclosure. Among them, by mounting the rotary drive motor centrally and beneath the floor, improved access to the rotary drive motor for repair and adjustment of the header is provided. In addition, by locating the rotary drive motor beneath the floor the harvester operator has improved visibility of the header.

Figure 11:
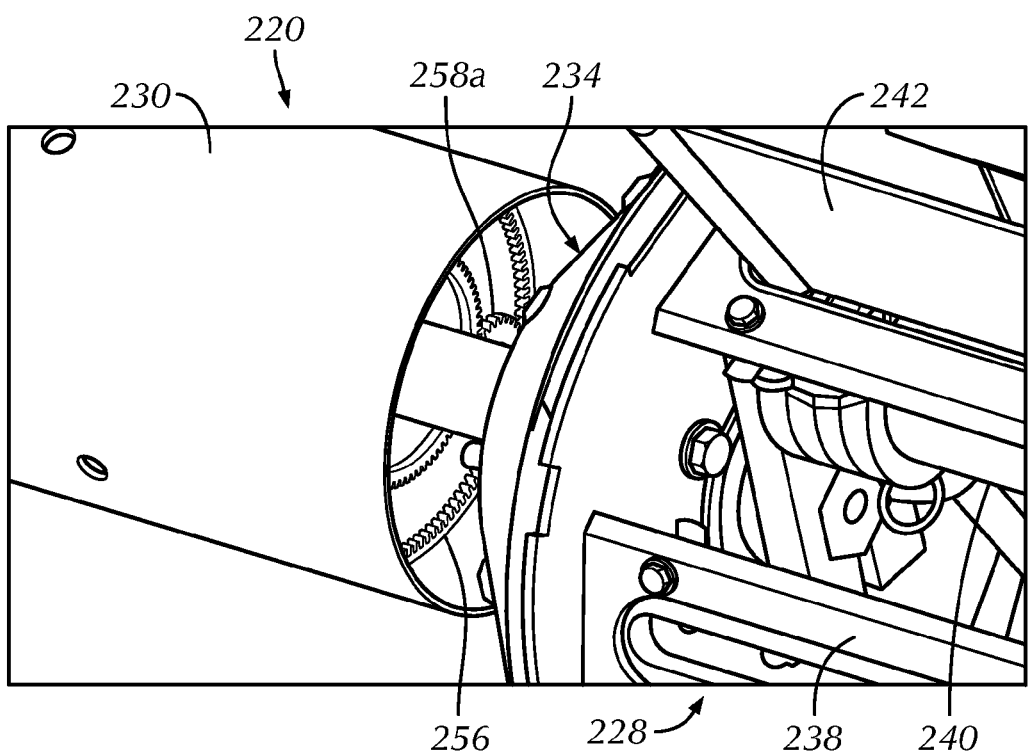
FIG. 11 is an enlarged perspective view of a rotary connection in accordance with yet another aspect of the subject disclosure with walls of the feeder assembly omitted for purpose of illustration.
Figure 12:
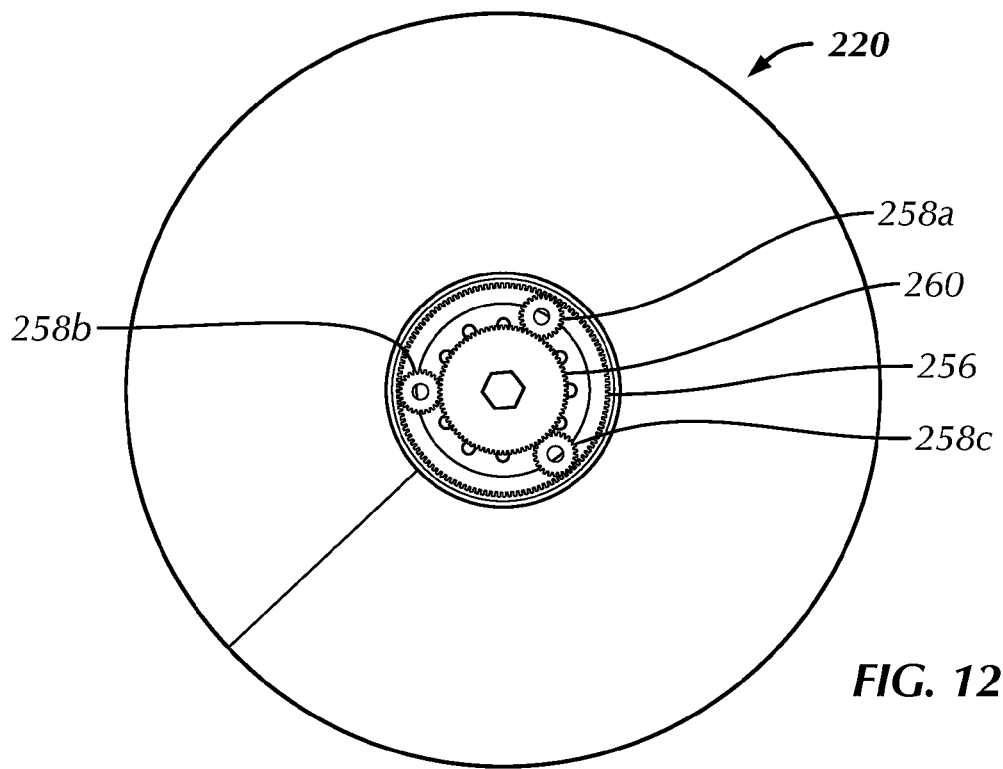
FIG. 12 is an enlarged lateral view of the rotary connection of FIG. 11.

In yet other aspects the rotational drive generated by the conveyor drive mechanisms 32*a*, 32*b* may be imparted to the feeder assembly through the rotary connections. In these aspects the rotary connections between the feeder assembly and the conveyor assembly can be e.g., by a gear mechanism or the like. In certain aspects of the subject disclosure the rotary connections may translate a rotational drive that drives the feeder assembly to the conveyor assembly. In certain aspects, the feeder assembly may rotate at a different rotational speed than the conveyor assembly. This may be achieved by implementing a transmission in the rotary connection. In an aspect of the subject disclosure thus configured, a conveyor is driven by the conveyor drive mechanism at a first rotational speed and the rotary device is driven by the rotary drive mechanism at a second rotational speed that is independent of the first rotational speed. Various transmission designs may be used in the rotary connection to achieve this result e.g., a planetary gear system, a continuously variable transmission, a roller based continuously variable transmission, or the like. A transmission implemented as a planetary drive mechanism that is suitable to achieve this result is illustrated in FIGS. 11 and 12.

As shown in FIGS. 4 and 7 the feeder assembly further includes an adjustment mechanism 50 connected to the axis 40 for adjusting the offset of the axis from axis A (the central rotational axis of the rotary device.) The adjustment mechanism has an arm that is operatively connected to the axis 40 for adjusting the offset of the axis from the central rotational axis of the canister. The arm extends downwardly through the floor so as to be accessible from beneath the floor. It will be understood that various technologies may be used to adjust the position of the axis by the adjustment mechanism e.g., a screw, a pneumatic drive, an actuator, or similar means. In operation adjusting the position of the axis changes the length of the extension members that are in contact with the flow of crop material. This length may be optimized for certain crop materials and/or rates of flow of crop material. In sum, the adjustment mechanism is connected to the axis for adjusting the offset of the axis from the central rotational axis of the rotary device. In certain aspects the adjustment mechanism can be implemented with an arm extending from the axis to a position below the floor.

In accordance with certain aspects of the subject disclosure, a header is provided wherein a conveyor assembly is mounted to the frame, the conveyor assembly has a rotatable auger configured to rotate at a first rotational speed. In addition, the header has a feeder assembly that is mounted to the frame and that includes a rotary device rotatably connected to the conveyor assembly and configured to rotate at a second rotational speed independent of the rotatable auger.

As shown in FIGS. 2-4, such aspects include a conveyor assembly that has one or more rotatable augers 30*a*, 30*b* configured to rotate at a first rotational speed and a rotary device 38 that is configured to rotate at a second rotational speed. The rotatable augers are driven by one or more conveyor drive motors 32a, 32b and the rotary device is configured to be driven by a rotary drive motor 56. The rotatable device and the rotary device are operably connected by rotary connections that are positioned underneath connection covers 34a, 34b.

In certain aspects the header further includes a transmission that connects the conveyor drive mechanism to the rotary device to rotate the rotary device at a second rotational speed independent of the first rotational speed (the rotational speed of the rotatable augers). The transmission is configured to receive a drive from the conveyor drive mechanism and to translate the drive to the rotary device so that the rotary device rotates at a second rotational speed. An example of a suitable transmission is described below with respect to FIGS. 11 and 12. In certain aspects of the subject disclosure, such as that illustrated by FIG. 2, the transmission acts as a rotary connection at one or both ends of the feeder assembly. The transmission may alternatively be positioned underneath the floor of the header.

FIG. 8 provides a perspective view of mount 44 that is suitable to be positioned above the floor of the frame (as shown in FIG. 5) as in the aspects described in the subject disclosure. The mount as illustrated in FIG. 8 is suitable to support the feeder assembly on the frame as illustrated in FIG. 5. The endless belt passes through the interior defined by the mount and is thus encapsulated by the mount. This allows the mount to shield the endless belt from the flow of crop material that passes the feeder assembly towards the back wall of the frame.

Figure 9:
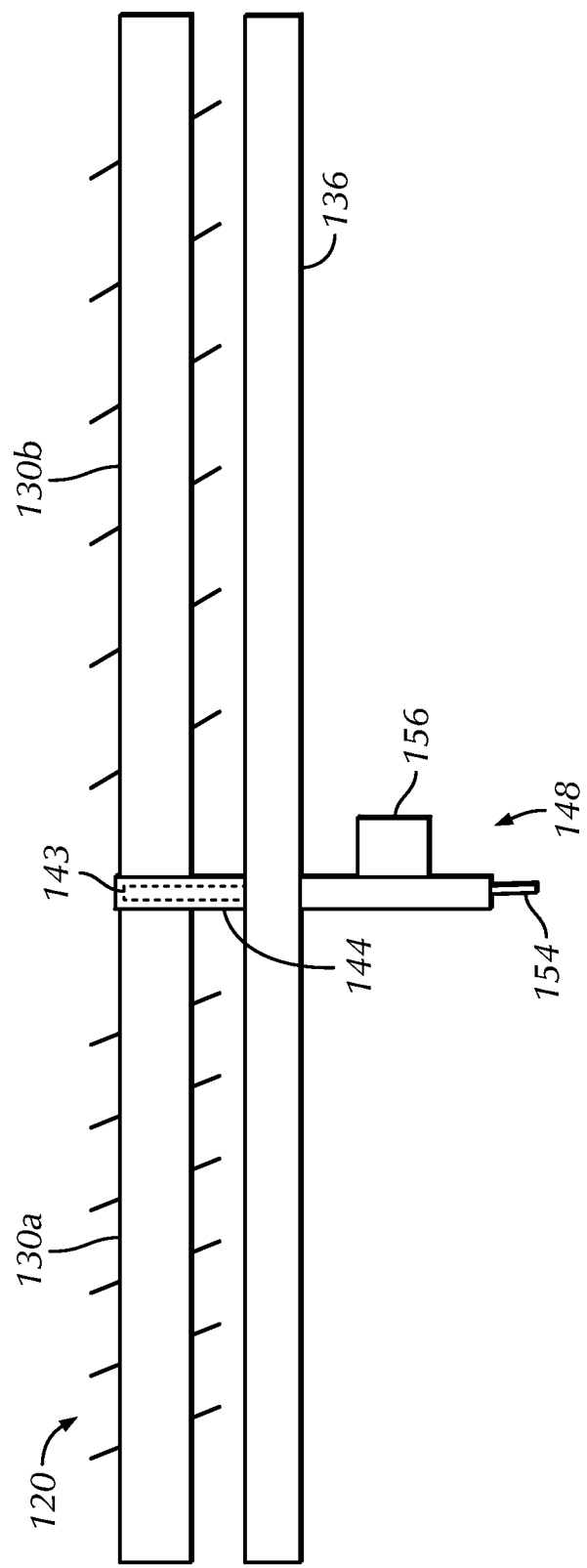
FIG. 9 is a schematic view of a feeder assembly in accordance with another aspect of the subject application.

FIG. 9 is a schematic view of a conveyor assembly 120 and drive mechanism 148 in accordance with another aspect of the subject disclosure. The aspect illustrated by FIG. 9 includes many of the features described with respect to the aspect illustrated by FIGS. 2-8 and is similarly configured except as described. In particular, the aspect illustrated by FIG. 9 does not have a feeder assembly and does have a single drive motor 156 mounted to the frame beneath the floor 136 and positioned about a medial section of the frame. In the aspect of the subject disclosure shown schematically in FIG. 9 there is a conveyor assembly mounted above the floor to urge a flow of crop material towards the center of the frame during harvesting operations. The drive mechanism is operatively connected to the conveyor assembly 120 by a gear mechanism 143 to drive movement of the conveyor assembly. The drive mechanism 148 includes drive motor 156 mounted to the frame beneath the floor about a medial section of the header.

As illustrated by FIG. 9, the conveyor assembly 120 has two conveyors 130a, 130b each of which is attached at a central end above mount 144. The mount supports the gear mechanism 143 which supports the conveyor assembly and is located about a center of the frame and positioned proximate to the back wall of the frame. In other words, there is a mount supporting the conveyor assembly about the medial section on the frame. The outer ends of the conveyors are mounted to the respective side walls of the frame. In certain aspects of the subject disclosure one or both of the conveyors 130a, 130b extend in a widthwise direction of the header. Between the two conveyors is the mount which includes a rotary connection that is operatively connected to each of the conveyors and configured to drive rotation of each of the conveyor segments via drive motor 156.

The drive mechanism 148 includes the drive motor 156 and an endless belt 154 that connects the drive motor to the conveyor assembly. The drive motor 156 is located beneath the floor 136 about a medial or center section of the header. The drive mechanism is operatively connected to a gear mechanism 143 that drives the conveyors. Thus the conveyors are operatively connected through the gear mechanism to the drive mechanism 148 and are configured to receive rotation from the drive mechanism. The endless belt translates rotation from the drive motor to the gear mechanism and in turn to each of the conveyors. The endless belt is encapsulated by the mount in order to shield the endless belt from the flow of crop material.

Figure 10:
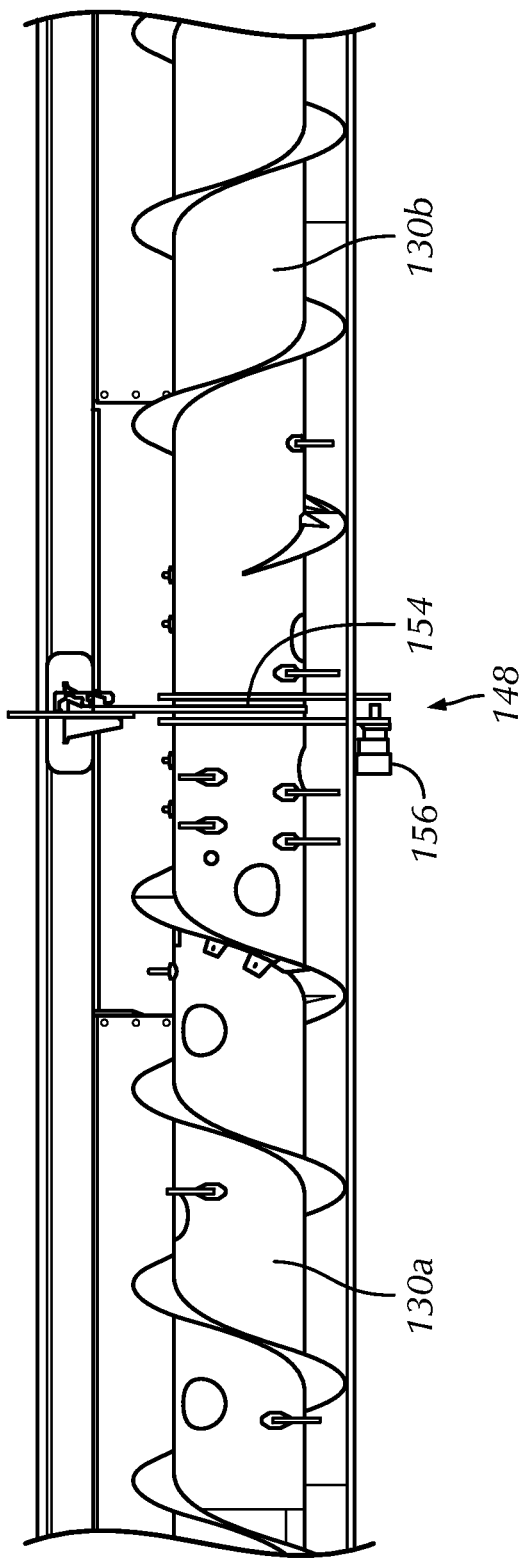
FIG. 10 is a detailed enlarged partial front elevation view of the feeder assembly shown schematically in FIG. 9.

As shown in FIGS. 9 and 10 the drive motor 156 is mounted below the floor 136. The aspect of the subject disclosure illustrated in FIG. 9 may be implemented in various other configurations, for example in a configuration where the drive motor is located above the floor of the frame or at a position central to the frame. Each of these configurations provide particular advantages with respect to conventional positioning of the drive motor at one or both of the sides of the frame. In particular, positioning the drive motor near the center of the header allows for ease of maintenance and improved sight lines to the header for the operator of the harvester.

It should be understood that in yet another aspect of the subject disclosure that is distinct from the aspect illustrated in FIGS. 9 and 10, the conveyor assembly 120 may be modified to include a feeder assembly between the two conveyors as described with respect to FIGS. 2-8 and an auger connected to the feeder assembly. Accordingly in such an aspect, the feeder assembly has extension members for engaging the flow of crop material during harvesting operations and a gear mechanism 143 for operatively connecting the feeder assembly to the drive motor 156. In addition there is a conveyor connected to the feeder assembly.

FIGS. 11 and 12 illustrate a transmission in accordance with certain aspects of the subject disclosure. The transmission includes a planetary gear system suitable to implement a rotary connection 234 between a conveyor assembly 220 and a feeder assembly 228. The conveyor assembly includes a conveyor and a conveyor drive mechanism as shown in FIG. 2. The feeder assembly includes an extension member 242 which is rotatably mounted to axis 240, a rotary device 238, and a rotary drive mechanism (not shown).

The transmission includes an annular gear 256 and a sun gear 260. As illustrated in FIG. 12, the sun gear engages gears 258a, 258b, and 258c which in turn engage and drive the annular gear. The conveyor is connected to the annular gear. The rotary device is connected to the sun gear. This arrangement causes the conveyor to rotate at a first rotatable speed which is different from and thus independent of the second rotational speed at which the rotary device rotates. While FIGS. 11 and 12 illustrate an aspect wherein the transmission is positioned collinearly with the conveyor, it should be understood that in certain aspects of the subject disclosure such a transmission can be positioned underneath the floor of the header.

As shown in FIGS. 11 and 12, the transmission provides a rotary connection between the conveyor assembly and the feeder assembly that can provide rotational drive to the conveyor assembly and the feeder assembly. In an aspect in accordance with the subject disclosure the transmission transmits rotational drive between the conveyor assembly and the feeder assembly but allows the conveyor assembly to rotate at a rotational speed independent of the rotational speed of rotary device. This arrangement allows the extension member to direct a flow of crop at a different rotational speed than the rotational speed of the conveyor. In certain aspects the header can include a conveyor drive mechanism which provides rotational drive to the feeder assembly 228 via the transmission. In alternative aspects the header can be configured without a conveyor drive mechanism. In such aspects the rotary drive mechanism of the feeder assembly can provide rotational drive to both the feeder assembly and conveyor assembly via the transmission.

It will be appreciated by those skilled in the art that changes could be made to the aspects described above without departing from the broad inventive concept thereof. It is to be understood, therefore, that the subject disclosure is not limited to the particular aspects disclosed, but it is intended to cover modifications within the spirit and scope of the subject disclosure as defined by the appended claims.

What is claimed is:

1. A header for an agricultural harvester comprising:
   a frame having a floor;
   a conveyor assembly mounted above the floor to urge a flow of crop material during harvesting operations, the conveyor assembly comprising a first rotatable auger, a second rotatable auger and a feeder assembly between the first and second rotatable augers;
   a drive mechanism operatively connected to the conveyor assembly to drive movement of the conveyor assembly, the drive mechanism comprising a drive motor mounted to the frame beneath the floor about a medial section of the header; and
   a rotary connection connecting the drive mechanism to the conveyor assembly, the rotary connection disposed between inner ends of the first rotatable auger and the second rotatable auger.

2. The header of claim 1, wherein the first rotatable auger and the second rotatable auger extend in a widthwise direction of the header.

3. The header of claim 1, wherein the feeder assembly has extension members rotatable about a central rotational axis of the feeder assembly.

4. The header of claim 1, further comprising a mount supporting the conveyor assembly on the frame at the medial section of the header.

5. The header of claim 4, wherein the drive mechanism further comprises an endless belt operatively connected between the conveyor assembly and the drive motor, and wherein the mount encapsulates the endless belt between the conveyor assembly and the floor.

6. The header of claim 1, wherein the feeder assembly is coaxial with the first and second augers.

7. The header of claim 1, wherein the first and second augers are coaxial.

8. The header of claim 1, wherein the feeder assembly comprises:
   a central rotational axis;
   an axis extending across the feeder assembly and offset from the central rotational axis; and
   an extension member extending from and pivotably connected to the axis.

9. The header of claim 8, wherein the feeder assembly further comprises an adjustment mechanism operatively connected to the axis for adjusting the offset of the axis from the central rotational axis of the feeder assembly.

10. The header of claim 9, wherein the feeder assembly includes a plurality of extension members extending from the axis.

11. The header of claim 9, wherein the feeder assembly includes a housing for housing the axis and the extension member.

12. The header of claim 9, wherein the feeder assembly includes a housing that includes a slot, and wherein the extension member extends through the slot.

13. The header of claim 1, wherein the first rotatable auger is spaced from the second rotatable auger, and the feeder assembly is disposed adjacent an inner end of the first rotatable auger and the second rotatable auger.

* * * * *